United States Patent
Ng et al.

(10) Patent No.: US 6,360,223 B1
(45) Date of Patent: Mar. 19, 2002

(54) RULE-BASED APPROACH TO OBJECT-RELATIONAL MAPPING STRATEGIES

(75) Inventors: Tony Chun Tung Ng, Fremont; Timothy R. Learmont, Palo Alto, both of CA (US)

(73) Assignees: Sun Microsystems, Inc., Palo Alto, CA (US); Baan Development, B.V., Barneveld (NL)

(*) Notice: Subject to any disclaimer, the term of this patent is extended or adjusted under 35 U.S.C. 154(b) by 0 days.

(21) Appl. No.: 09/106,210

(22) Filed: Jun. 29, 1998

Related U.S. Application Data

(60) Provisional application No. 60/068,415, filed on Dec. 22, 1997.

(51) Int. Cl.[7] .................................. G06F 17/30
(52) U.S. Cl. ..................... 707/100; 707/4; 707/102; 707/103
(58) Field of Search .................... 707/103, 4, 100, 707/102

(56) References Cited

U.S. PATENT DOCUMENTS

| 4,589,092 A | | 5/1986 | Matick |
|---|---|---|---|
| 5,043,876 A | | 8/1991 | Terry |
| 5,261,069 A | | 11/1993 | Wilkinson et al. |
| 5,263,155 A | | 11/1993 | Wang |
| 5,280,612 A | | 1/1994 | Lorie et al. |
| 5,291,583 A | | 3/1994 | Bapat |
| 5,301,297 A | | 4/1994 | Menon et al. |
| 5,499,371 A | | 3/1996 | Henninger et al. |
| 5,504,885 A | * | 4/1996 | Alashqur ............... 707/103 |
| 5,542,078 A | | 7/1996 | Martel et al. |
| 5,574,882 A | | 11/1996 | Menon et al. |
| 5,596,746 A | | 1/1997 | Shen et al. |
| 5,615,362 A | | 3/1997 | Jensen et al. |
| 5,659,738 A | | 8/1997 | Letkeman et al. |
| 5,701,453 A | | 12/1997 | Maloney et al. |
| 5,706,506 A | | 1/1998 | Jensen et al. |
| 5,732,257 A | | 3/1998 | Atkinson et al. |
| 5,742,813 A | | 4/1998 | Kavanagh et al. |
| 5,765,159 A | * | 6/1998 | Srinivasan ............... 707/102 |
| 5,774,731 A | | 6/1998 | Higuchi et al. |
| 5,812,134 A | | 9/1998 | Pooser et al. |
| 5,829,006 A | * | 10/1998 | Parvathaneny et al. ..... 707/101 |
| 5,835,910 A | | 11/1998 | Kavanagh et al. |
| 5,850,544 A | * | 12/1998 | Parvathaneny et al. ..... 707/101 |
| 5,857,197 A | | 1/1999 | Mullins |
| 5,878,411 A | | 3/1999 | Burroughs et al. |
| 5,893,108 A | * | 4/1999 | Srinivasan et al. ......... 707/103 |
| 5,878,419 A | * | 5/1999 | Carter ..................... 707/10 |
| 5,907,846 A | * | 5/1999 | Berner et al. ............. 707/103 |
| 5,937,409 A | * | 8/1999 | Wetherbee ................ 707/103 |
| 6,003,040 A | | 12/1999 | Mital et al. |
| 6,009,428 A | | 12/1999 | Kleewein et al. |
| 6,038,565 A | | 3/2000 | Nock |
| 6,049,673 A | | 4/2000 | McComb et al. |

FOREIGN PATENT DOCUMENTS

| EP | 0 472 812 A1 | 2/1991 |
|---|---|---|
| WO | WO 95/04960 | 2/1995 |
| WO | WO 97/03586 | 2/1995 |
| WO | WO 97/03406 | 1/1997 |

OTHER PUBLICATIONS

T. Lindholm and F. Yellin, "The Java Virtual Machine Specification" Second Edition, Apr. 1999, pp. 1–473.

(List continued on next page.)

*Primary Examiner*—Frantz Coby
(74) *Attorney, Agent, or Firm*—Finnegan, Henderson, Farabow, Garrett & Dunner, L.L.P.

(57) ABSTRACT

Mapping rules for use in mapping data between a relational model and an object model. A user interface permits a programmer or other person to enter the mapping rules, and a mapping tool converts data between the relational model and the object model according to the mapping rules.

19 Claims, 12 Drawing Sheets

OTHER PUBLICATIONS

"Customizable Four Pane Layout for Database Table Definition," Dec. 1992, pp. 268–269.

H. Bank, "OQl," Sep. 15, 1997 (Rev. 0.11), pp. 1–7.

"Applications in Java and Extended Java," Sep. 28, 1998, pp. 1–21.

"Sun Simplifies Database Programming with Java Blend," Aug. 21, 1997, pp. 1–3.

S. Wang, "Improvement of Concurrency Control Within Object–Oriented Database Systems," Apr. 5, 1990, IEEE, pp. 68–70.

S. Heiler and S. Zdonik, "Object Views: Extending the Vision," 1990 IEEE, pp. 86–93.

D. Agrawal, A. Bernstein, P. Gupta, and S. Sengupta, "Distributed Multi–Version Optimistic Concurrency Control for Relational Database," Mar. 1986, pp. 416–421.

X. Qian and L. Raschid, "Query Interoperation Among Object–Oriented and Relational Databases," Mar. 6, 1995, IEEE, pp. 271–278.

S. Gantimahapatruni and G. Karabatis, "Enforcing Data Dependencies in Cooperative Information Systems," May 12, 1993, IEEE, pp. 332–341.

IBM Technical Disclosure Bulletin, vol. 38, No. 01, Jan. 1995, FAST and Secure Stored Procedures for a Client/Server DBMS, pp. 79–82.

A. Alashqur and C. Thompson, "O–R Gateway: A System for Connecting C++Application Programs and Relational Databases," Aug. 10, 1992, pp. 151–169.

R. Ahad and T. Cheng, Hewlett–Packard Journal 44 (1993) Jun., No. 3, "HP OpenODB: An Object–Oriented Database Management System for Commercial Applications," pp. 20–30.

TOPLink, "The Industry Standard for Persistence Product, A White Paper: The Object People", 1997.

IBM Technical Disclosure Bulletin, vol. 37, No. 08, Aug. 1994, "Automatically Revising Function Prototypes in C and C++Implementations of Systems Object Model Classes," pp. 363–365.

C. Kleissner, "Enterprise Objects Framework, A Second Generation Object–Relational Enabler," Jun. 1995, pp. 455–459.

"The Enterprise Objects Framework," Jul. 1994, pp. 1–12.

Arnold and Gosling, "The Java™ Programming Language," Addison–Wesley 1996.

"The Enterprise Object Framework," Enterprise Objects Framework: Building Reuseable Business Objects, Jul. 1994, pp. 1–13.

Lee et al., Outer Joins and Filters for Instantiating Objects from Relational Databases through Views, Feb. 1994, Knowledge and Data Engineering, IEEE Transaction, vol. 6, Issue 1, pp. 108–119.*

King, Nelson, "Java in the Database Server" (Jun. 1998), URL http://www.dbmsmag.com/9806d13.html, pp. 1–8.

*Sun Microsystems*, "Java Blend Tutorial", Java Software Division, pp. 1–76 (Jun. 1998).

Fitsilis et al., Producing Relational Database Schemata from an Object Oriented Design, IEEE, pp. 251–257, Sep. 1994.*

SQL Tutorial: Introduction to Structured Query Language, Version 3.63 (May 1998), URL http://w3.one.net/~jhoffman/sqitut.htm#Compound Conditions.

The JDBC Database Access API (Apr. 1998), URL http://java.sun.com/products/jdbc.

O'Brien, Stephen K., "Turbo Pascal 5.5: The Complete Reference", Osborne/McGraw–Hill (1989), pp. 500–522.

Gosling, Joy, and Steele, "The Java™ Language Specification", Addison–Wesley (1996).

Hamilton, Cattell, and Fisher, "JDBC Database Access with Java™", Addison–Wesley (1997).

R.G.G. Cattell et al., "Object Database Standard: ODMG 2.0", Morgan Kaufmann Publishers, Inc. (1997).

Campione, Mary and Kathy Walrath, "The Java™ Tutorial", Addison–Wesley (1996).

\* cited by examiner

```
CLASS CUSTOMER {
INT CUST_ID;
STR SSN;
COLLECTION ORDERS_FOR_CUSTOMER;
INT       GET_CUST_ID ( );
VOID      SET_CUST_ID (INT CUST_ID);
STR       GET_SSN ( );
VOID      SET_SNN (STR SSN);
ITERATOR  GETORDERSFORCUSTOMER ( );
VOID      ADDORDERSFORCUSTOMER (ORDER O);
VOID      REMOVEORDERSFORCUSTOMER (ORDER O);
}
```
420

```
CLASS ORDER {
INT ORDER_ID;
STR DATE;
CUSTOMER CUSTOMER_FOR_ORDER;
INT       GET_ORDER_ID ( );
VOID      SET_ORDER_ID (INT ORDER_ID);
STR       GET_DATE ( );
VOID      SET_DATE (STR DATE);
CUSTOMER  GETCUSTOMERFORORDER ( );
VOID      SETCUSTOMERFORSSORDER (CUSTOMER c);
```
424

RULE-BASED APPROACH TO OBJECT-RELATIONAL MAPPING STRATEGIES

REFERENCE TO RELATED APPLICATIONS

The following identified U.S. patent applications are relied upon and are incorporated in their entirety by reference in this application as if fully set forth.

Provisional U.S. Patent Application No. 60/068,415, entitled "System and Method for Mapping Between Objects and Databases," filed on Dec. 22, 1997.

U.S. patent application Ser. No. 09/106,186, entitled "Object Relational Mapping Tool That Processes Views," and filed on the same date herewith.

U.S. patent application Ser. No. 09/106,189, entitled "Evolution Of Object-Relational Mapping Through Source Code Merging," and filed on the same date herewith.

U.S. patent application Ser. No. 09/105,957, entitled "Integrating Both Modifications to an Object Model and Modifications to a Database into Source Code by an Object-Relational Mapping Tool," and filed on the same date herewith.

U.S. patent application Ser. No. 09/106,212 entitled "User Interface for the Specification of Lock Groups," and filed on the same date herewith.

U.S. patent application Ser. No. 09/106,119, entitled "A Fine-Grained Consistency Mechanism for Optimistic Concurrency Control Using Lock Groups," and filed on the same date herewith.

U.S. patent application Ser. No. 09/106,211, entitled "User Interface for the Specification of Index Groups Over Classes," and filed on the same date herewith.

U.S. patent application Ser. No. 09/106,188, entitled "Method and Apparatus for Creating Indexes in a Relational Database Corresponding to Classes in an Object-Oriented Application," and filed on the same date herewith.

U.S. patent application Ser. No. 09/106,190, entitled "Method and Apparatus for Loading Stored Procedures in a Database Corresponding to Object-Oriented Data Dependencies," and filed on the same date herewith.

U.S. patent application Ser. No. 09/106,046, entitled "An Integrated Graphical User Interface Method and Apparatus for Mapping Between Objects and Databases," and filed on the same date herewith.

U.S. patent application Ser. No. 09/106,955, entitled "Methods and Apparatus for Efficiently Splitting Query Execution Across Client and Server in an Object-Relational Mapping," and filed on the same date herewith.

FIELD OF THE INVENTION

The present invention relates to a user interface for specifying rules for use in mapping data between a first data model and a second data model and, more particularly, between a relational model and an object model.

BACKGROUND OF THE INVENTION

Object-relational mapping tools facilitate development of application programs that utilize a relational database. A relational database stores data in tables having rows (records) and columns (fields). The tables are usually interrelated, and thus, there is a logical structure imposed on the database. This logical structure is known as a schema. Each table has a primary key, comprising one or more columns that uniquely identify a row. For example, in a table with rows of customers, a column storing each customer's social security number may be used as the primary key because it uniquely identifies each customer in the table. A table may also have another key, known as a foreign key, associating a row in one table to one or more rows in another table. For example, where one table contains customer information and another table contains order information for the customers, a foreign key may exist to relate one customer (or row) in the customer table with one or more orders (or rows) in the order table.

Object-relational mapping tools read a database and automatically generate source code from the database. This source code contains a number of classes whose interrelationships reflect the logical structure, or schema, of the database. A class, such as a Java™ class, is a data structure containing both data members that store data and function members (or methods) that act upon the data. The source code contains one class for each table in the database, and each class has a data member for each column in the corresponding table. Additionally, the classes contain function members that are used to both get and set the values for the data members and, eventually, update the database.

By using an object-relational mapping tool, a programmer can automatically generate source code to facilitate their database application development. After the source code is generated, the programmer writes code to interact with the classes in the source code and not the database, thus hiding the complexities of interacting with the database from the programmer. This allows a programmer who is familiar with object-oriented programming to code against familiar classes and not unfamiliar, sometimes cumbersome to use, database query languages.

Although beneficial to programmers, conventional object-relational mapping tools suffer from a limitation. When a programmer runs the object-relational mapping tool, it generates a default mapping including source code with classes that reflect the structure of the database at that time. However, the programmer often cannot "fine tune" the mapping before the conventional mapping tool performs the conversion, but rather must manually enter changes, such as performing customizations on generated classes, after mapping is complete. It is therefore desirable to improve object-relational mapping tools.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

FIG. 4B depicts source code generated from the object model depicted in FIG. 4A, FIGS. 5A, 5B, and 5C are diagrams of mappings between tables and corresponding objects;

SUMMARY OF THE INVENTION

Apparatus and methods consistent with the present invention include a user interface to view and enter information relating to mapping rules for use with a mapping tool that maps data between data models according to the rules.

A method consistent with the present invention includes providing a user interface having information representing options for mapping of a data representation between a first data model and a second data model having objects within a class structure. Information for defining mapping rules associated with the options is received through the user interface.

An apparatus consistent with the present invention provides a user interface having information representing options for mapping of a data representation between a first data model and a second data model having objects within a class structure. The apparatus receives through the user interface information for defining mapping rules associated with the options.

DETAILED DESCRIPTION

Methods and systems consistent with the present invention permit a user to specify mapping rules using a user interface. Mapping rules are information relating to the mapping of particular database entities from a first data model to a second data model, or from a relational model to an object model. A relational model, for example, may be mapped in many different ways to a particular object model, and mapping rules specify how to accomplish the mapping.

A relational model is a representation of a data stored in a relational database, and an object model is a representation of data stored in an object-oriented structure. First and second data models are representations of data stored in, respectively, first and second types of data structures or databases. Database entities are particular defined portions of a database, for example, a table, object, or another type of structure for storing data. A mapping tool maps data between a relational model and an object model, or between first and second data models, according to the mapping rules. A user thus need not necessarily manually enter particular information into the object model, for example, as the user's mapping rules specify desired types of mapping before conversion of the data by the mapping tool.

Overview of Mapping Tool

In accordance with methods and systems consistent with the present invention, the improved object-relational mapping tool maps a database by first querying the database to determine its schema and then by creating an internal data structure (known as the "database data structure") representing that schema. From this data structure, the object-relational mapping tool creates an object model containing all of the information necessary to generate classes and then creates source code containing a number of Java classes that may be used by a programmer to interface with the database.

Implementation Details

Figure 1:
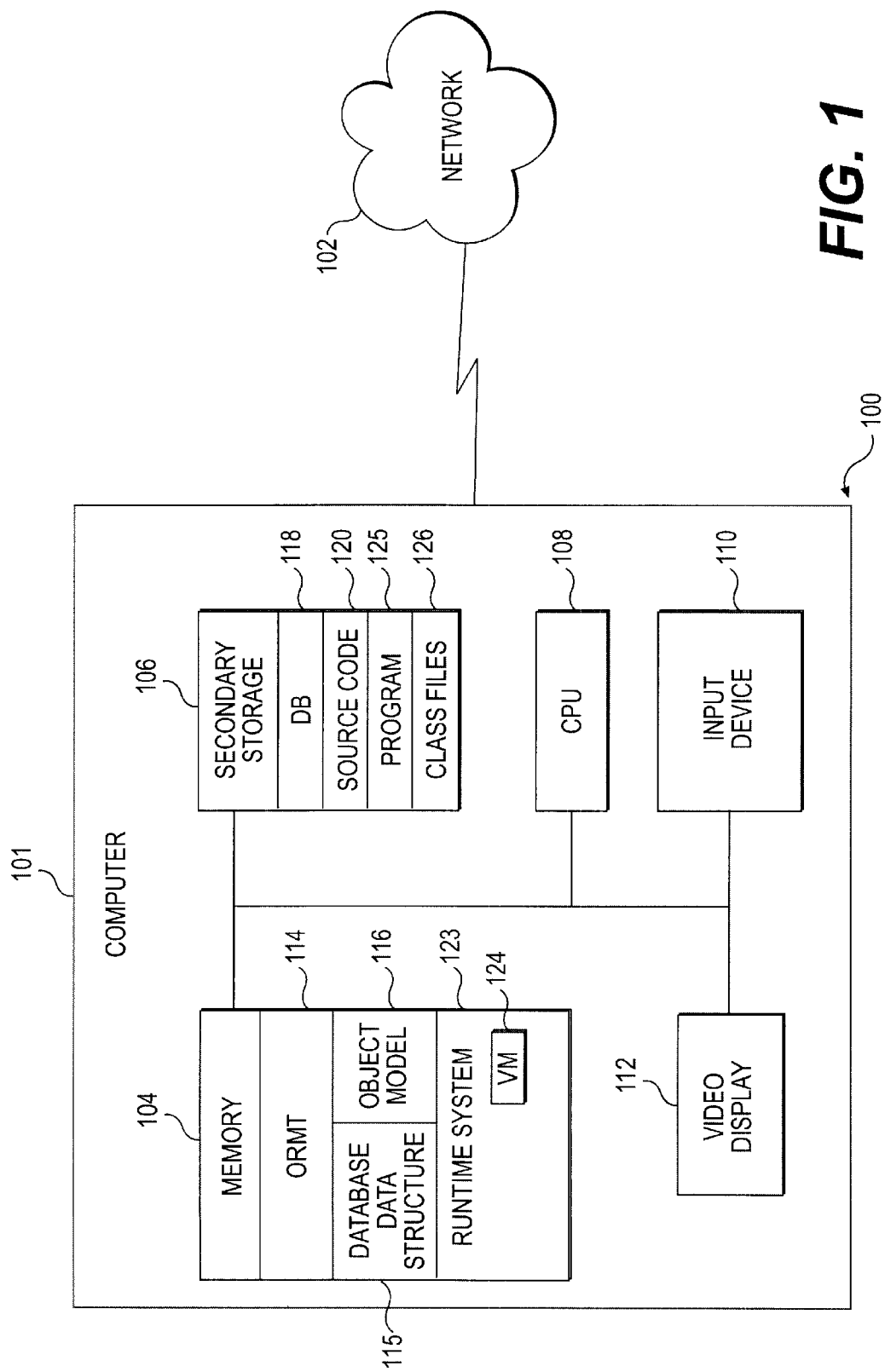
FIG. 1 depicts a data processing system suitable for practicing methods and systems consistent with the present invention.

FIG. 1 depicts a data processing system 100 suitable for practicing methods and systems consistent with the present invention. Data processing system 100 includes computer 101 connected to a network 102, such as the Internet. Computer 101 includes memory 104, secondary storage device 106, central processing unit (CPU) 108, input device 110, and video display 112. Memory 104 includes an object-relational mapping tool 114 (ORMT) in accordance with methods and systems consistent with the present invention. In turn, the object-relational mapping tool 114 includes object model 116 and database data structure 115, reflecting the schema of database 118, stored on secondary storage device 106. Also stored on secondary storage device 106 is source code 120, containing classes reflecting the schema of database 118 and containing any customizations of the programmer.

Memory 104 also includes a runtime system 123, which includes a virtual machine (VM) 124. Secondary storage device 106 further contains a program 125 with source code and various class files 126. An exemplary runtime system for purposes of implementing methods and systems consistent with the principles of the present invention includes the Java™ runtime system included in the Java™ Development Kit from Sun Microsystems, Inc. The Java runtime system includes a Java VM. The Java VM is described in Lindholm and Yellin, *The Java™ Virtual Machine Specification*, Addison-Wesley (1997), which is incorporated herein by reference.

Although computer 101 is depicted with various components, one skilled in the art will appreciate that this computer can contain additional or different components. Additionally, although computer 101 is shown connected to the network 102, computer 101 may be connected to other networks, including other wide area networks or local area networks. Furthermore, although aspects of the present invention are described as being stored in memory, one skilled in the art will appreciate that these aspects can also be stored on or read from other types of computer program products or computer-readable media, such as secondary storage devices; including hard disks, floppy disks, or CD-ROM; a carrier wave from the Internet; or other forms of RAM or ROM. Still further one skilled in the art will appreciate that database 118 and source code 120 may be stored on or distributed across other devices on the network 102. In addition, the computer-readable media may include instructions for controlling a computer systems, such as computer 101, to perform a particular method.

Sun, Sun Microsystems, the Sun logo, Java™, and Java™-based trademarks are trademarks or registered trademarks of Sun Microsystems, Inc. in the United States and other countries.

Object-relational mapping tool 114 reads database 118 to examine its schema, constructs database data structure 115 to reflect this schema, generates an object model 116 based on database data structure 115, and then creates source code 120 based on object model 116. It should be noted that, at the time object model 116 is generated, the object-relational mapping tool allows the programmer to add customizations, and these customizations will be reflected in the source code 120. For example, the programmer may add a new method, rename a field (and use it for a different purpose), change the attributes of a field (e.g., the type or whether it can accept a null value), or override the mapping of a field. When a field mapping is overridden, that field will not appear in the source code.

Figure 2:
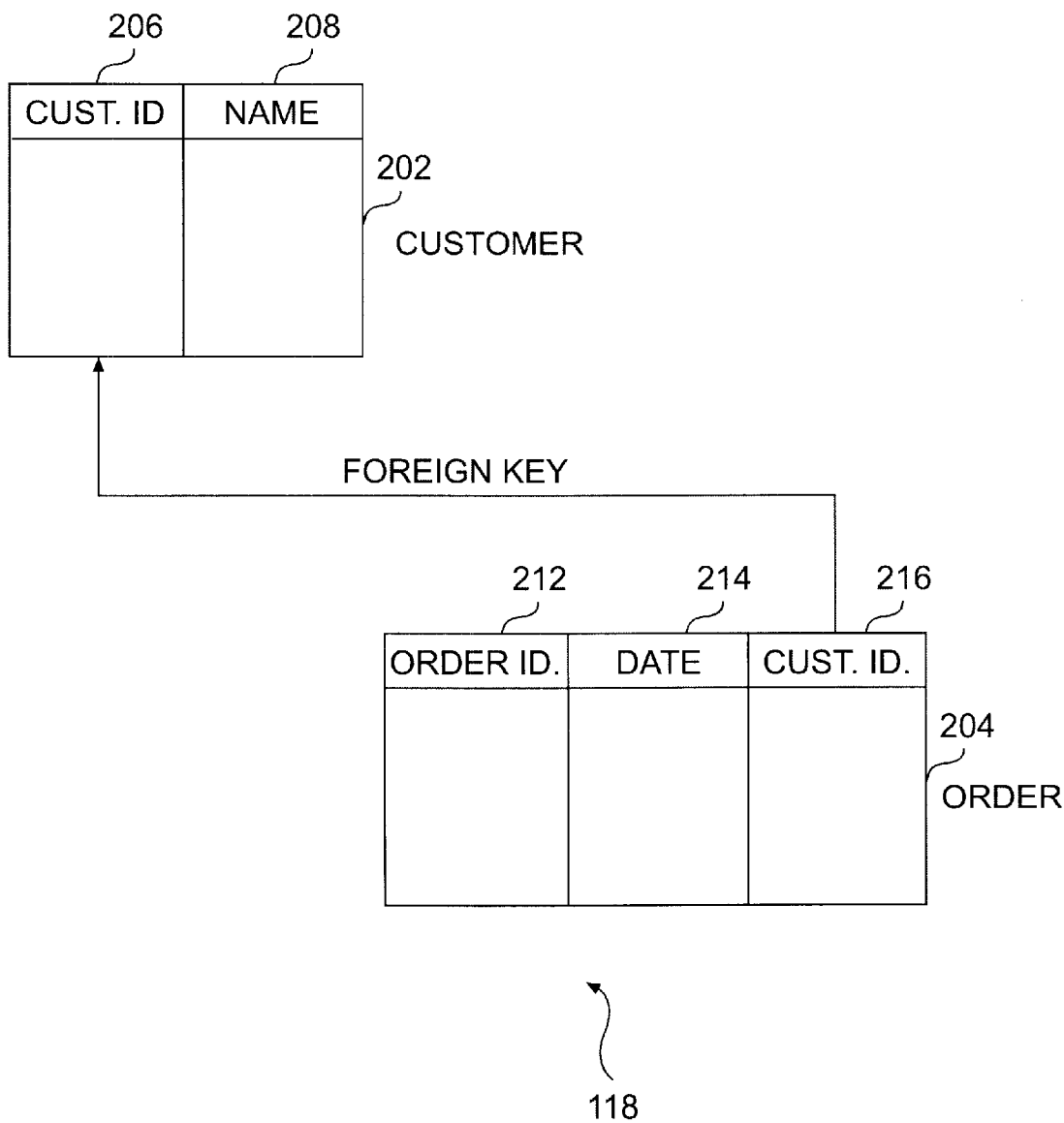
FIG. 2 depicts a more detailed diagram of the database depicted in FIG. 1.

FIG. 2 depicts a more detailed diagram of an example of database 118, containing a customer table 202 and an order table 204. The customer table 202 includes a customer ID column 206, and a name column 208. The customer ID column 206 serves as the primary key for the customer table 202. The order table 204 includes order ID column 212, date column 214, and customer ID column 216. The order ID column 212 serves as the primary key for the order table 204. Customer ID column 216 is the foreign key to customer ID column 206, meaning customer ID column 216 refers to the customer ID column 206 in one or more rows.

Figure 3:
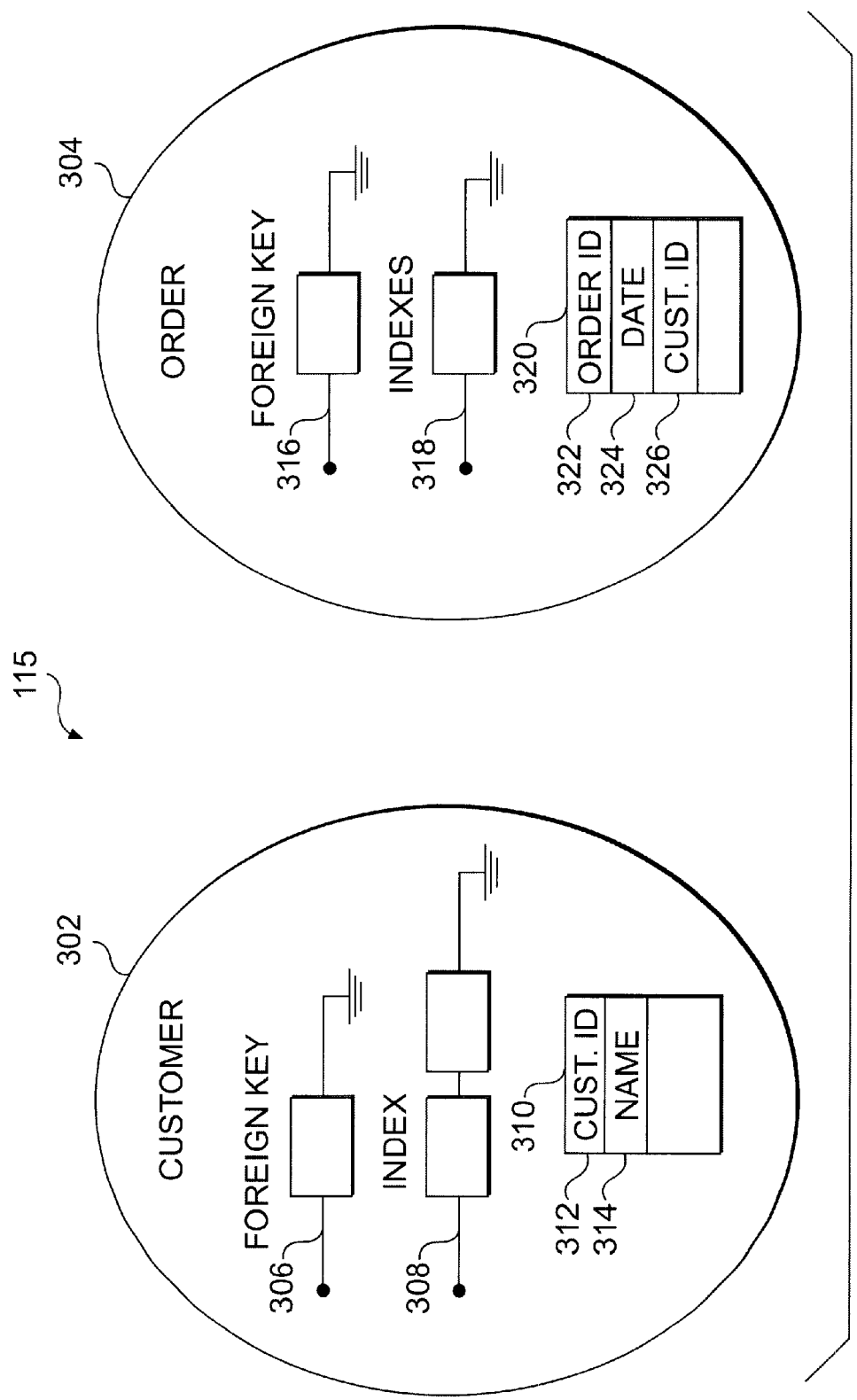
FIG. 3 depicts a database data structure reflecting the schema of the database depicted in FIG. 1.

As previously stated, database data structure 115 represents the schema of database 118. Object-relational mapping tool 114 creates database data structure 115 by querying database 118 to identify its schema and by creating the data structure to reflect the schema. This process is known as "importing" the database schema and is described in further detail below. Once created, database data structure 115 appears as shown in FIG. 3 and includes an object 302, reflecting the customer table 202, and an object 304, reflecting the order table 204. Object 302 contains a list 306 of foreign key objects, if any, each containing the name of the foreign key as well as an indication of the columns that comprise the foreign key. Additionally, object 302 contains a list 308 of the indexes in the customer table 202, where each element of the list is an index object containing an indication of the type of index (e.g., primary, non-unique, and unique) and a list of columns that comprise the index. Object 302 also contains a hash table 310, where each entry in the hash table is a column object 312, 314 containing data for a particular field, including its name, type, and length. Object 304 contains similar information, including a list of foreign keys 316, a list of indexes 318, and a hash table 320 with column objects 322–326 for each field or column.

Figure 4A:
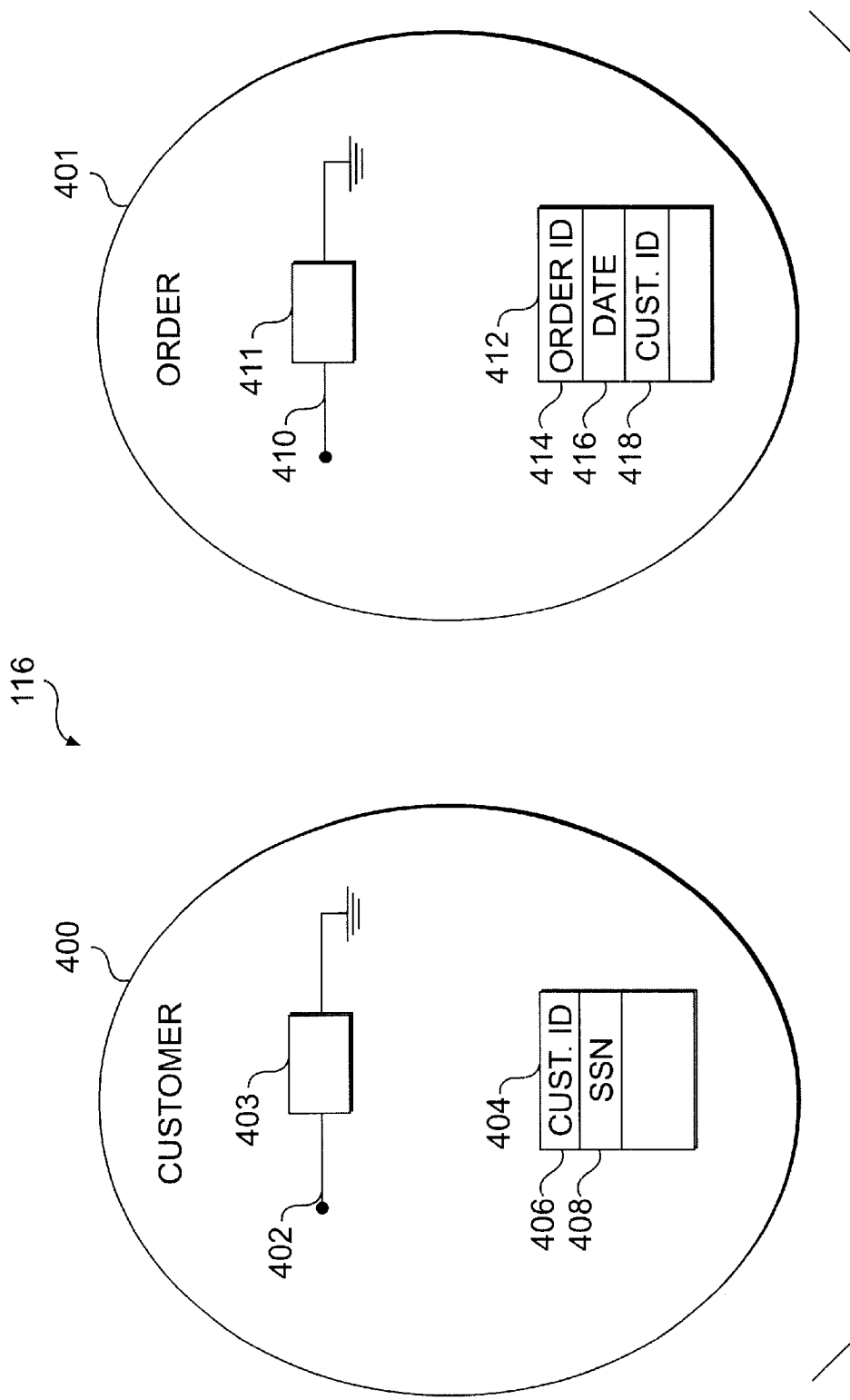
FIG. 4A depicts an object model containing information derived from the database data structure depicted in FIG. 3.

Using the object-relational mapping tool, the programmer may customize the object model. For example, the programmer may rename the name field to SSN and may subsequently use this field to store the customer's social security number, in which case the customer's social security number will be stored in the name field 208 of the database 118. By making such a customization, it is reflected in the object model 116 shown in FIG. 4A. Object model 116, generated by the object-relational mapping tool, contains the programmer's customization (e.g., the name field has been renamed to SSN). Object model 116 contains objects 400 and 401, representing an intermediate form of the information for a class before it is written as source code. Object 400 contains information for the customer table 202, including a list 402 of relationship objects 403, each containing information indicating a relationship (i.e., a foreign key). For example, relationship object 403 links a field in object 400 with a field in object 401. Additionally, object 400 contains a hash table 404 with an entry 406, 408 for each field in customer table 202, each entry containing the name and type of the field. Similarly, object 401 contains information for order table 204, including a list 410 of relationship objects 411 and a hash table 412 containing entries 414–418 for each field in order table 204.

As can be appreciated from this description of object model 116, it contains all of the information necessary to create the classes in the source code, an example of which is depicted in FIG. 4B. FIG. 4B depicts source code file 116 with the Java™ programming language representation of objects 400 and 401. Class 420 reflects customer table 202 and class 424 reflects order table 204. As such, class 420 contains a data member for customer ID, social security number, and a collection of objects representing the orders associated with that particular customer, thus implementing the foreign key. Class 420 also contains a number of methods to both get and set the value of the data members, including an iterator method to iterate through the order for this particular customer. Class 424 includes data members order ID and date and also includes various methods to both set and get the values for these data members. Additionally, class 424 contains a field, Customer_for_Order, implementing the foreign key with a reference to the particular customer object that placed that order.

When a foreign key is contained in the object model, the object-relational mapping tool typically creates a relationship in the source code between two classes to implement the foreign key. As stated above, with a foreign key, one or more records in one table (the referring table) refers to one record in another table (the referred table). This relationship is a one-to-many relationship, although it may be a one-to-one relationship. Additionally, instead of being bidirectional, the relationship may be unidirectional. To define this relationship in the Java™ programming language, the class representing the referring table is defined to have a member that is a collection of the class representing the referred table. A "collection" refers to a type indicating a grouping of instances of other classes. Then, in the class reflecting the referred table, a member is added providing a reference to the class that refers to it. For most cases, this is how a foreign key is implemented. However, when the foreign key for two tables overlaps with the primary key for those tables, it is more efficient to simply subclass the class reflecting the referred class from the class reflecting the referring class.

Mapping Rules

Figure 5A:
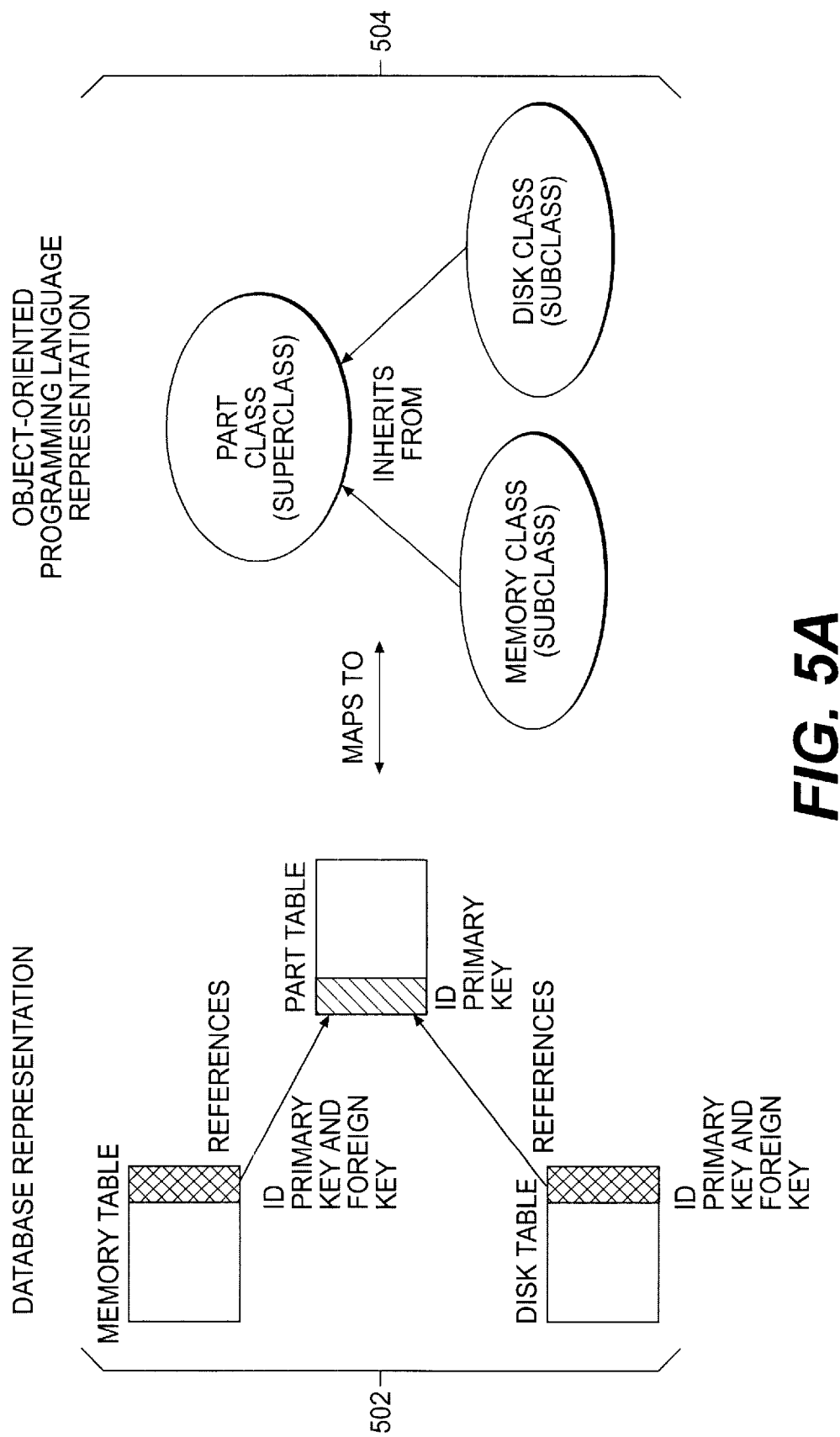
FIG. 5 is a diagram of mapping between tables and corresponding objects.

FIGS. 5A–5C and 6 illustrate how tables having particular relationships, such as a primary key or foreign key, are mapped to corresponding objects using a mapping tool, such as the mapping tool described above. FIG. 5A, in particular, illustrates exemplary mapping of inheritances and relationships between tables and illustrates one way, among many possible ways, of mapping such inheritances and relationships. A superclass-subclass object relationship 504 corresponds to a foreign key 502. Assume an object-oriented application has a set of classes including a part class, a memory class and a disk class. The memory and disk class are subclasses of the part class as shown in superclass-subclass object relationship 504. Because the memory and disk classes are subclasses they inherit methods, fields, and interfaces of the part class. They also may extend the part class to define unique aspects of the memory or disk parts.

To represent the superclass-subclass object relationship 504, the database uses a foreign key 502 in the database. Essentially, a table is a subclass of another table if the primary key of the table is also a foreign key that references the primary key of another table. In this example, the table used to store each instance of a disk class contains a column having a primary key that is also a foreign key to the primary key in the part table. Likewise, the table used to store each instance of the memory class contains a column having a primary key that is also a foreign key to primary key in the part table. These foreign keys maintain referential integrity in the database when objects are added or deleted. Specifically, if the part object is deleted, the presence of a foreign key requires that corresponding entries in memory table and disk table to be deleted as well.

Figure 5B:
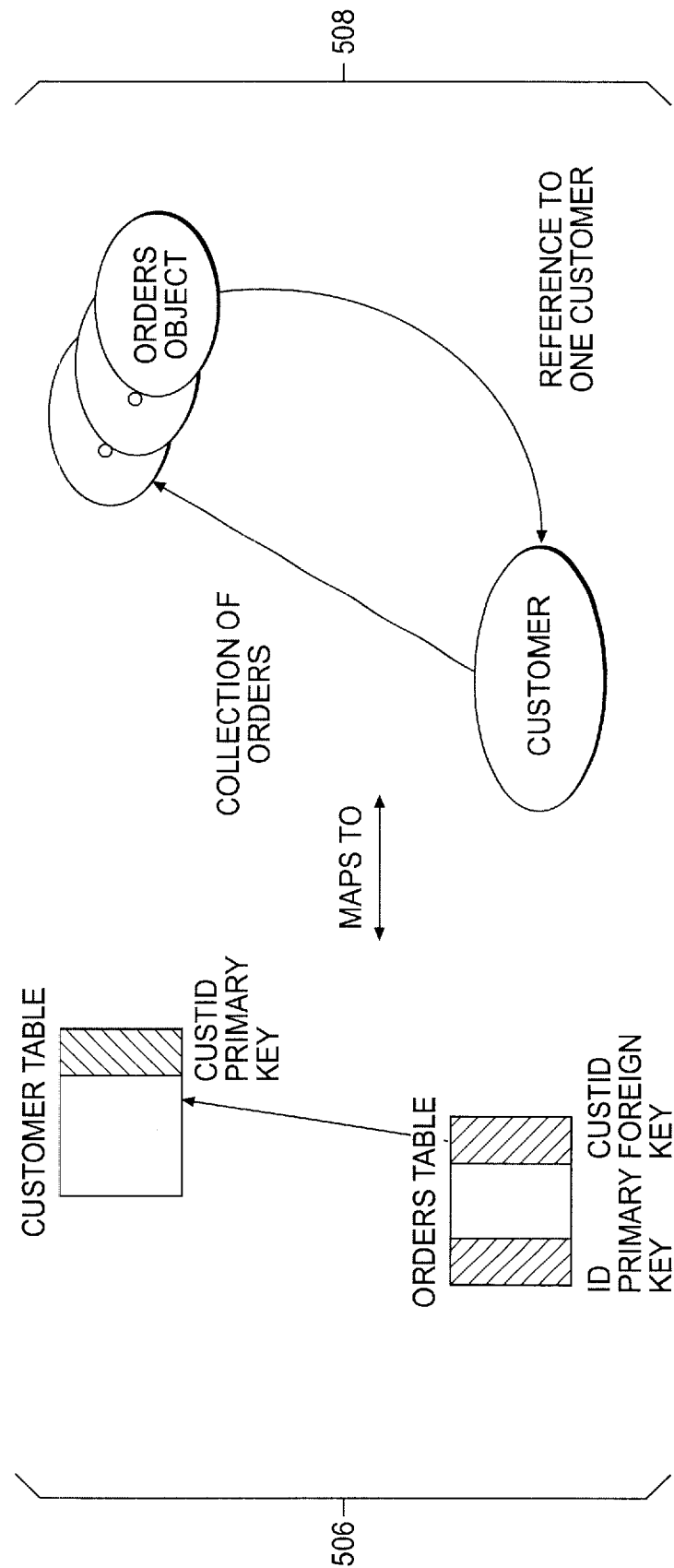

In addition to representing class hierarchy, foreign keys and primary keys can also be used represent the one-to-many relationships between classes. FIG. 5B illustrates a one-to-many class relationship 508 and a one-to-many table relationship 506. One-to-many class relationship 508 allows a customer object to have many order objects but each order object can only be associated with one customer object. The customer class in one-to-many object relationship 508 has a field in the class that references multiple order objects. Each order object has a field that contains a single reference to a particular customer object. The corresponding one-to-many table relationship 506 includes an orders table having an CUSTID primary key column entry and a separate CUSTID foreign key column. The customer table includes a CUSTID primary key which is unique for each customer in the system. This mechanism ensures referential integrity in the object representation in the database. A deletion of a customer from the database requires a deletion of that customer's corresponding orders in the order table based upon the CUSTID foreign key. However, deleting an order from the order table does not require a deletion of the corresponding customer.

Figure 5C:
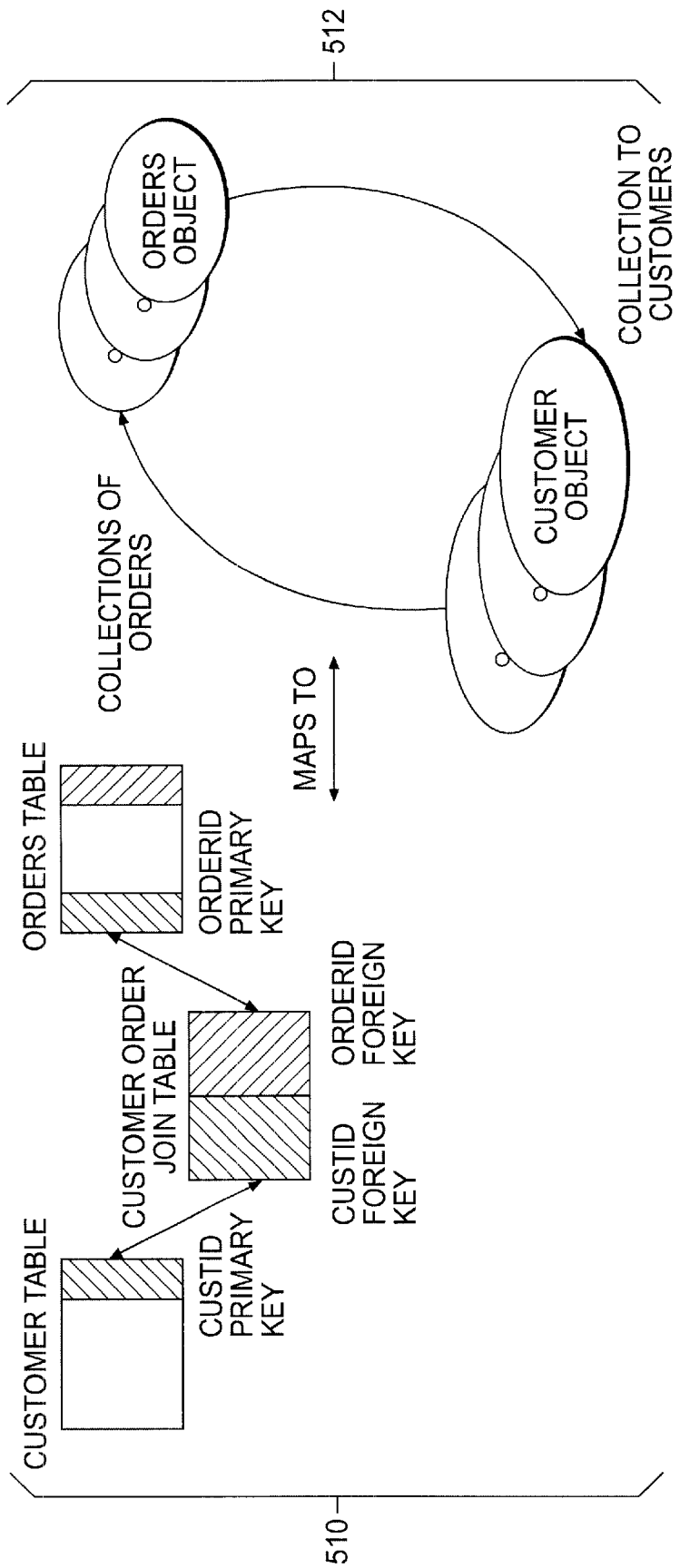

Foreign keys and primary keys can also be used to represent a many-to-many object relationship. FIG. 5C illustrates a many-to-many class relationship 512 and a many-to-many table relationship 510. Assume a customer object can reference multiple order objects and orders can be from multiple customers. The many-to-many object relationship 512 is represented in the database using a join table as shown with many-to-many table relationship 510. The join table is an intermediary table that is used to form the association between the entities in the two tables. A join table generally has two sets of columns. One set of columns forms a foreign key reference to the primary key in one table. The other set of columns forms the foreign key reference to the primary key in the other table. In this example, a customer order join table has a CUSTID foreign key mapped to a CUSTID primary key in a customer table and an ORDERID foreign key mapped to an ORDERID primary key in an orders table respectively.

Figure 6:
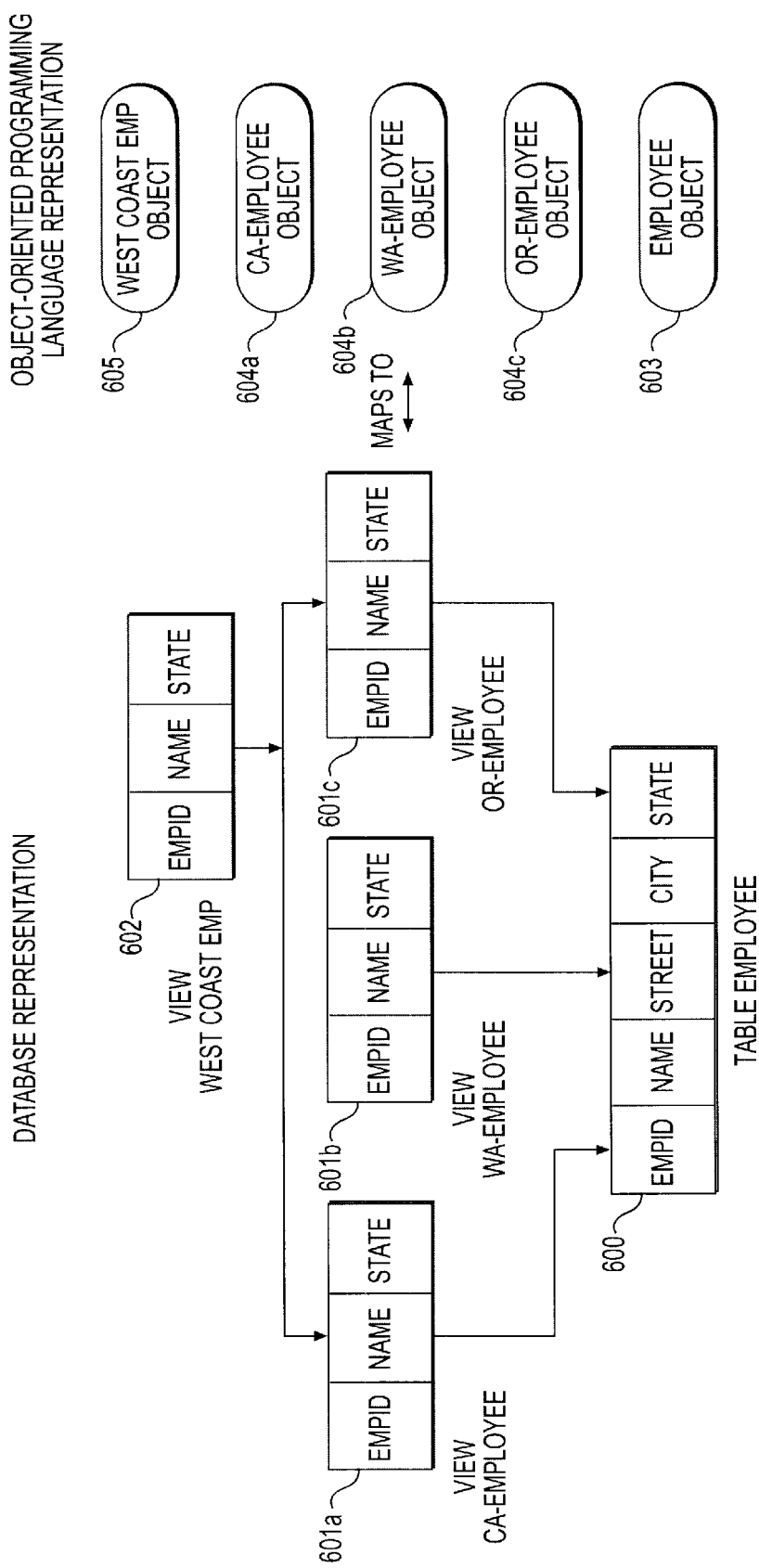
FIG. 6 is a diagram of mapping between tables, including base tables and views, and corresponding objects.

FIG. 6 illustrates mapping between tables and objects, when the tables include a base table and views. A view is another representation of data from a table, and it provides a different view of one or more underlying tables. Views may be nested, meaning they are built on underlying views, which are defined on an underlying table. For example, as shown in FIG. 6, a base table Employee 600 includes fields for information identifying employees, and Employee table 600 includes several views. For example, three views 601a, 601b, and 601c represent tables including information from Employee table 600 for particular types of employees, in this example employees located in California, Washington, and Oregon. Another view 602 represents a table having information identifying west coast employees. Therefore, a user may use views to illustrate a sub-category of data from a particular table.

FIG. 6 also illustrates the mapping of base tables and views into objects. The base table Employee 600 is mapped to a corresponding Employee object 603. Views are also typically structured and stored in the form of tables, and they are selectively mapped to corresponding objects. In particular, views 601a, 601b, and 601c are mapped, respectively, to corresponding objects 604a, 604b, and 604c, and view 602 is mapped to corresponding object 605.

Mapping Rules User Interface

An implementation consistent with the present invention includes a user interface for specifying mapping rules. A "user interface" refers to a mechanism to view a representation of information in a computer system, such as computer 101, and to enter information into the computer system. The entered information may include commands instructing the computer to perform a particular function.

Figure 7:
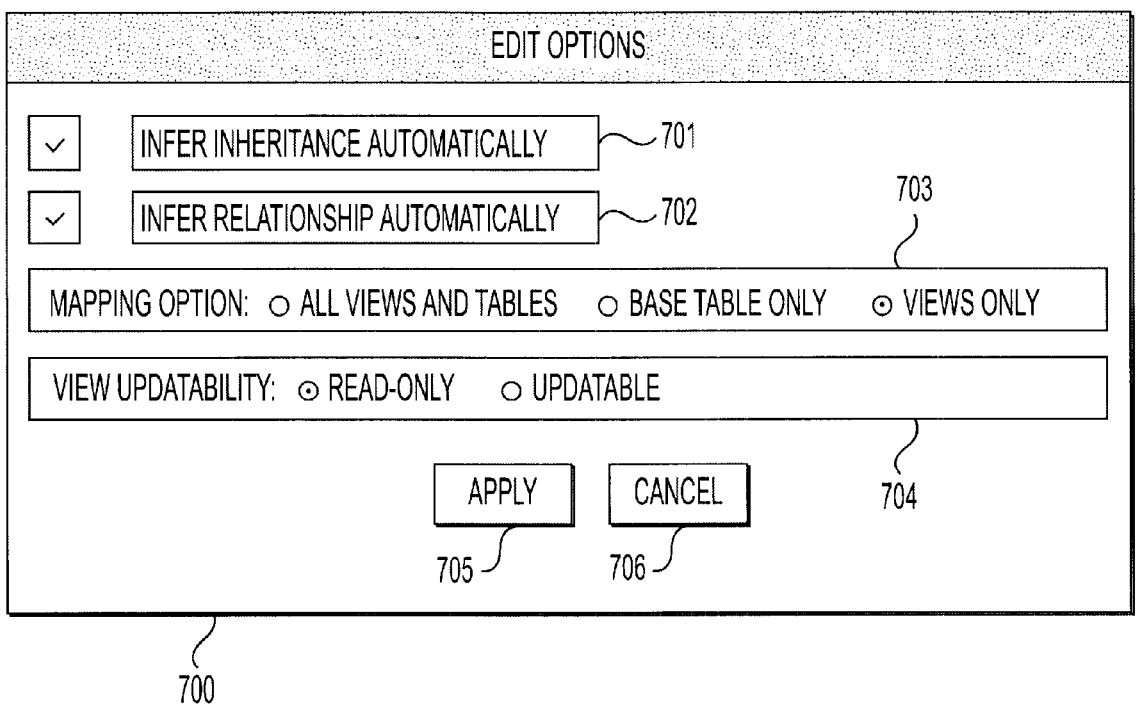
FIG. 7 is an exemplary user interface for specifying mapping rules for use with a mapping tool that maps data between a relational model and an object model.

FIG. 7 illustrates an example of such a user interface 700. Video display 112 may present user interface 700 in order to permit a user to view information relating to mapping rules, and a user may use input device 110, such as a cursor-control device, to enter or modify information through user interface 700. Mapping rules defined through user interface 700 are typically stored in computer 101 such as in memory 104 or secondary storage 106. The appearance and structure of user interface 700 are only one such example of a user interface for accomplishing functions relating to mapping rules, and implementations consistent with the present invention may include any mechanism to display and enter information relating to mapping rules.

User interface 700 includes several sections specifying options (or criteria) relating to mapping of a data representation and permitting a user to specify mapping rules. A "section" refers to an area of a user interface in which a system presents information or receives information from a user. In section 701, a user may select the option of inferring inheritances, and in section 702, a user may select the option of inferring relationships. Inheritances and relationships among tables and objects are explained with respect to FIGS. 5A–5C. The act of selecting may include using a cursor-control device to "click on" or "double click on" a particular item or section in the user interface. When a user selects section 701 or 702, or the boxes next to them, a check mark appears in the box next to the corresponding section to indicate its selection. When a user "clicks on" the section again, or the box next to it, to deselect the option, the check mark disappears, indicating deselection of the corresponding option.

In section 703, a user may select options for mapping of tables and views. These exemplary options include mapping all tables and views, mapping base tables only, and mapping views only. Mapping of base tables and views is explained with respect to FIG. 6. A user selects one of these options by "clicking on" an option, or a circle next to it, in which case a dot appears in the corresponding circle to indicate selection of the option. A user may likewise "click on" the option again, or the circle next to it, to deselect it, in which case the dot disappears to indicate its deselection. A user selects view updatability in section 704 in a similar manner. The exemplary options for view updatability include providing views as read-only or updatable by a user. A read-only view is one which may not be modified by a user, while an updatable view may be modified by the user.

Other types of indicators are possible for showing selection of the options in sections 701–704, such as highlighting the corresponding section, displaying the section within a box or in a different color, or displaying some other type of icon next to the section. In addition, if other options are available depending upon the type of data models between which data is converted, user interface 700 may be configured in a similar manner to include those options.

Once a user has selected options, the user may select button 705 to save and apply the options during mapping of data. When a user selects button 705, the system saves the rules to memory, such as memory 104 or secondary storage 106 for later retrieval when performing mapping. A user may select button 706 to cancel any selected options, in which case the system does not save any selected options in user interface 700.

Mapping Rules Modules

Figure 8:
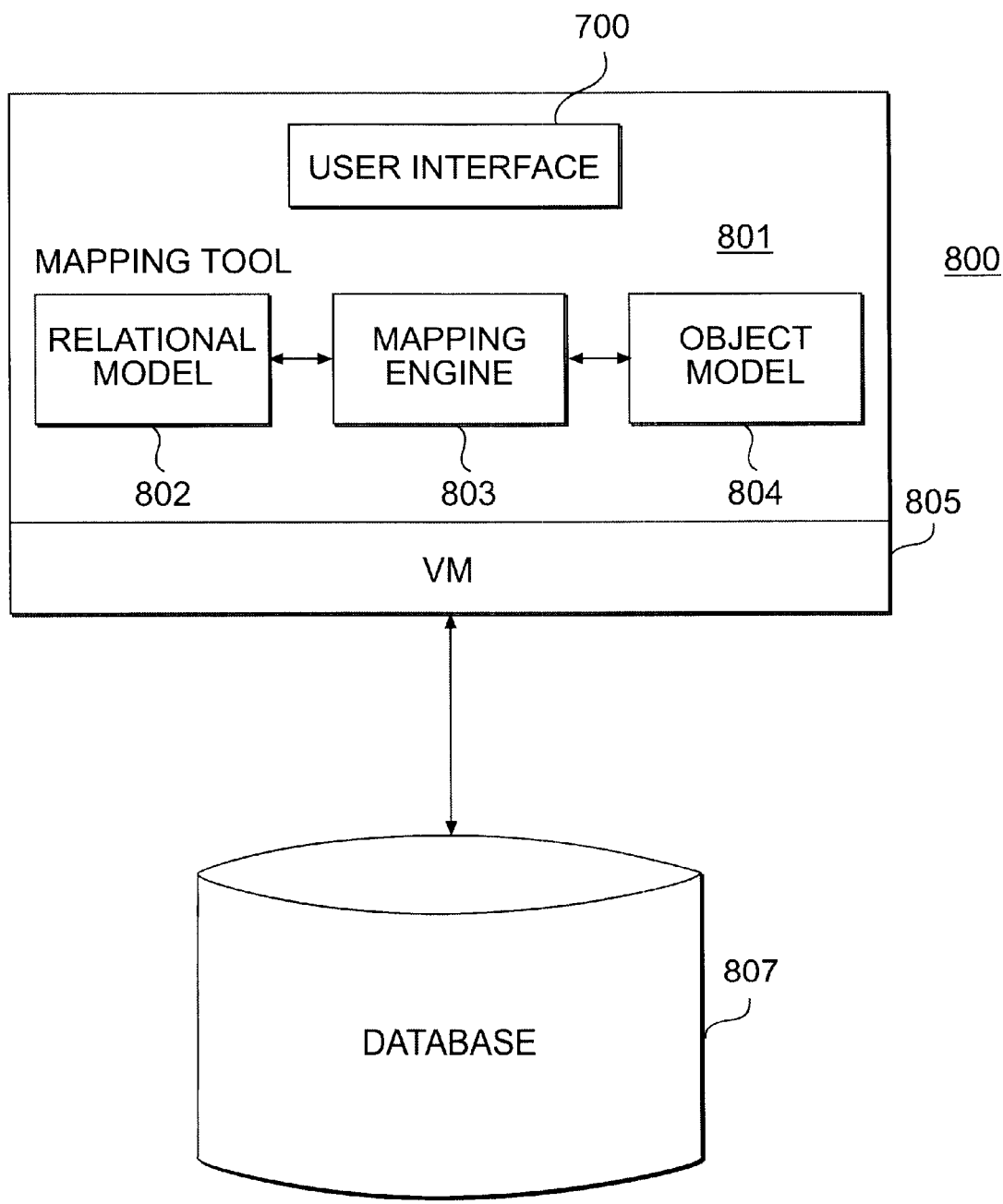
FIG. 8 is a diagram of software modules for use in processing associated with mapping rules.

FIG. 8 is a block diagram of software modules for implementing the exemplary user interface shown in FIG. 7. These modules may operate within the hardware elements shown in FIG. 1. In system 800, user interface 700 is typically part of a mapping tool 801 such as ORMT 114. Mapping tool 801 includes a relational model 802, an object model 804, and a mapping engine 803 for converting data between the relational model and the object model. Relational model 802 stores a representation of data from database 807 in tables, and object model 804 stores a representation of the data in objects. Relational model 802 may correspond to database data structure 115, and object model 804 may correspond to object model 116. Alternatively, elements 802 and 804 may store data in a first data model and a second data model. Mapping tool 801 interacts with VM 805, which may correspond to VM 124 in FIG. 1. System 800 is connected to a database 807 for storing data in relational or other form, and database 707 may correspond to database 118.

A user operating with user interface 700 interacts with mapping tool 801 in order to enter and define the mapping rules. Mapping engine 803 converts data between relational model 802 and object model 804, or between first and second data models, and may perform the conversion using the exemplary mapping tool described above. In performing the conversions, mapping engine 803 uses mapping rules entered through user interface 700 in order to determine whether to map inheritances and relationships between tables, and how to map base tables and corresponding views. Mapping tool performs the data conversion in accordance with the mapping rules, and may map data using the exemplary mapping tool explained above.

Mapping Rules Processing

Figure 9:
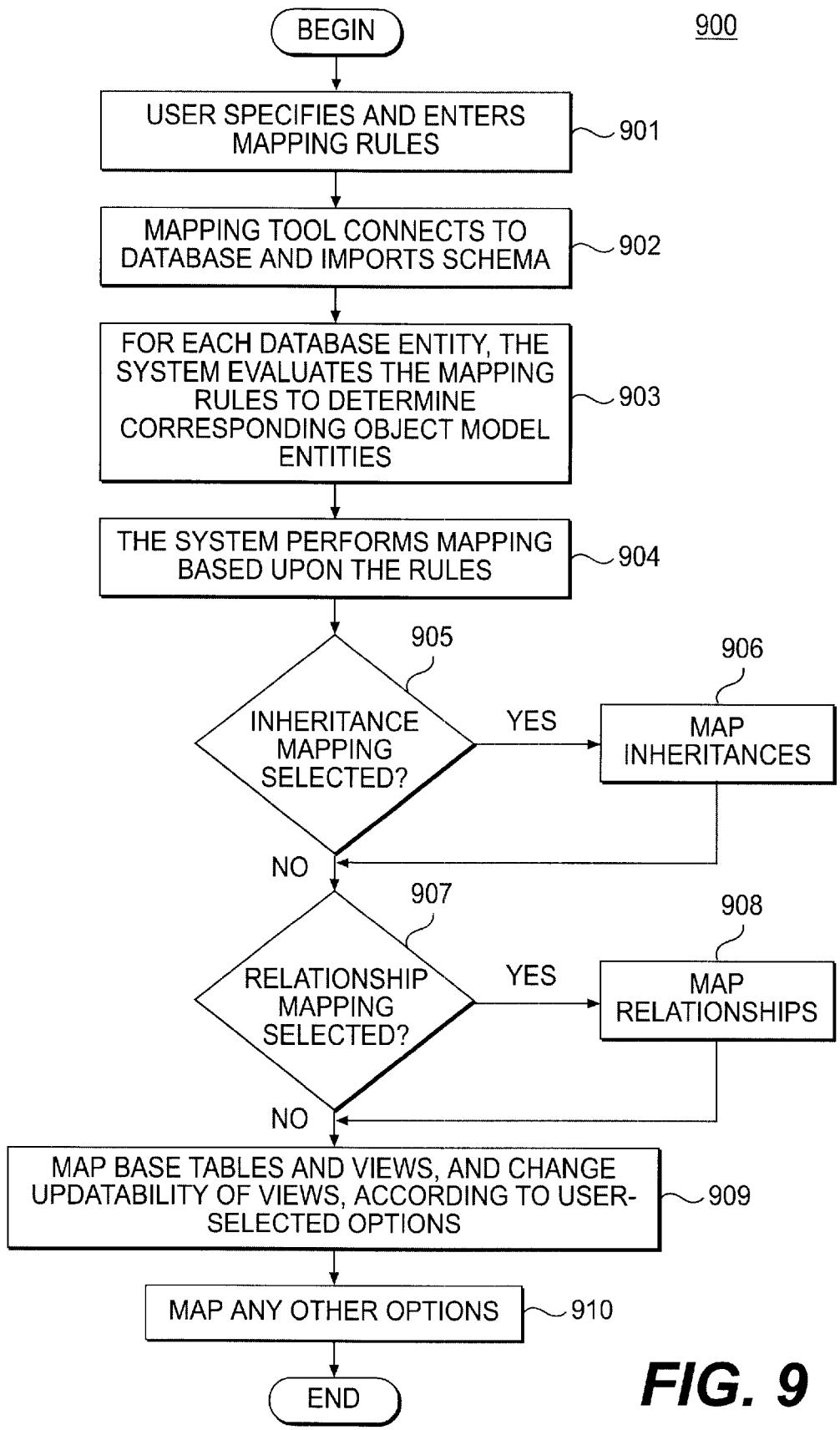
FIG. 9 is a flow chart illustrating exemplary processing associated with mapping rules.

FIG. 9 is a flow chart illustrating exemplary processing associated with user interface 700 shown in FIG. 7. This processing may be implemented by the software modules shown in FIG. 8 operating within the hardware elements shown in FIG. 1. In process 900, a user specifies and enters the mapping rules, which may be accomplished using user interface 700 (state 901). A mapping tool connects to database 807 and imports the schema (state 902). For each database entity, a mapping tool evaluates the mapping rules to determine corresponding object model entities (state 903) and performs mapping based upon the rules (state 904).

In performing the mapping, the system determines if the user selected inheritance mapping in section 701 of user interface 700 (state 905) and, if so, it maps inheritances (state 906). The system also determines if the user selected relationship mapping in section 702 (state 907) and, if so, it maps relationships (state 908). Inheritances and relationships may be mapped to corresponding objects as shown with respect to FIGS. 5A–5C and the exemplary mapping tool described above.

The system maps base tables and views according to the user's selected options in sections 703 and 704 (state 909). In particular, based upon the user's selection, the system maps all tables and views, base tables only, or views only. In addition, based upon the user's selection, the system changes the updatability of views. Base tables and views may be mapped to corresponding objects as shown with respect to FIG. 6 and the exemplary mapping tool described above. If the system includes any other types of options for mapping, it performs those as well according to user selected options (state 910).

While the present invention has been described in connection with a preferred embodiment, many modifications will be readily apparent to those skilled in the art, and this application is intended to cover any adaptations or variations thereof. For example, other types of user interfaces and hardware for presenting the user interface, and other types of programming languages for implementing an embodiment consistent with the present invention, may be used without departing from the scope of the invention. This invention should be limited only by the claims and equivalents thereof.

What is claimed is:

1. A method of defining mapping rules for mapping a data representation between a first data model and a corresponding second data model having objects within a class structure corresponding to data stored in a database, comprising:

providing a user interface having one or more configurations reflecting one or more options for defining rules for mapping of the data representation between the first data model and the second data model;

receiving a selection of one of the configurations from a user through the user interface; and automatically mapping the data representation between the first data model and the second data model based on the selected configuration.

2. The method of claim 1, wherein receiving a selection comprises:

receiving a command for automatically inferring an inheritance within the data representation.

3. The method of claim 1, wherein receiving a selection comprises:

receiving a command for automatically inferring a relationship within the data representation.

4. The method of claim 1, wherein receiving a selection comprises:

receiving a command for selectively mapping tables and views within the data representation.

5. The method of claim 1, wherein providing a user interface comprises:

supplying a relational model as the first data model; and
supplying an object model as the second data model.

6. The method of claim 1, wherein the step of receiving a selection does not require the user to create code for the selected mapping option.

7. An apparatus for defining mapping rules for mapping a data representation between a first data model and a corresponding second data model having objects within a class structure corresponding to data stored a database, comprising:

a module configured to provide a user interface having one or more configurations reflecting one or more options for defining rules for mapping of the data representation between the first data model and the second data model;

a module configured to receive a selection of one of the configurations from a user through the user interface; and a module configured to automatically map the data representation between the first data model and the second data model based on the selected configuration.

8. The apparatus of claim 7, wherein the module configured to receive a selection is further configured to:

receive a command for automatically inferring an inheritance within the data representation.

9. The apparatus of claim 7, wherein the module configured to receive a selection is further configured to:

receive a command for automatically inferring a relationship within the data representation.

10. The apparatus of claim 7, wherein the module configured to receive a selection is further configured to:

receive a command for selectively mapping tables and views within the data representation.

11. The apparatus of claim 7, wherein the module configured to provide a user interface comprises:

a module configured to supply a relational model as the first data model and an object model as the second data model.

12. The apparatus of claim 7, wherein the module for receiving a selection does not require the user to create code for the selected mapping option.

13. A computer-readable medium containing instructions for controlling a computer system to perform a method, the computer system having a data structure reflecting a representation between a first data model and a corresponding second data model having objects within a class structure corresponding to data stored in a database, the method comprising:

provide a user interface having one or more configurations reflecting one or more options for defining rules for mapping of the data representation between the first data model and the second data model;

receiving a selection of one of the configurations from a user through the user interface; and automatically mapping the data representation between the first data model and the second data model based on the selected configuration.

14. The computer-readable medium of claim 13, wherein receiving a selection comprises:

receiving a command for automatically inferring an inheritance within the data representation.

15. The computer-readable medium of claim 13, wherein receiving a selection comprises:

receiving a command for automatically inferring a relationship within the data representation.

16. The computer-readable medium of claim 13, wherein receiving a selection comprises:

receiving a command for selectively mapping tables and views within the data representation.

17. The computer-readable medium of claim 13 wherein providing a user interface comprises:

supplying a relational model as the first data model; and
supplying an object model as the second data model.

18. The computer-readable medium of claim 13, wherein the step of receiving a selection does not require the user to create code for the selected mapping option.

19. An apparatus for defining mapping rules for mapping a data representation between a first data model and a corresponding second data model having objects within a class structure corresponding to data stored in a database, comprising:

means for providing a user interface having one or more configurations reflecting one or more options for defining rules for mapping of the data representation between the first data model and the second data model;

means for receiving a selection of one of the configurations from a user through the user interface; and automatically mapping the data representation between the first data model and the second data model based on the selected configuration.

* * * * *